(12) United States Patent
Michaelides et al.

(10) Patent No.: US 10,033,321 B2
(45) Date of Patent: Jul. 24, 2018

(54) ELECTRIC MACHINE (71) Applicant: Jaguar Land Rover Limited, Coventry (GB)

(72) Inventors: Alexandros Michaelides, Coventry (GB); Jose Soler, Coventry (GB); Xavier Vinamata, Coventry (GB); Mike Richardson, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 196 days.

(21) Appl. No.: 15/025,381

(22) PCT Filed: Sep. 29, 2014

(86) PCT No.: PCT/EP2014/070825
§ 371 (c)(1),
(2) Date: Mar. 28, 2016

(87) PCT Pub. No.: WO2015/044429
PCT Pub. Date: Apr. 2, 2015

(65) Prior Publication Data
US 2016/0218655 A1 Jul. 28, 2016

(30) Foreign Application Priority Data
Sep. 30, 2013 (GB) .................................. 1317307.5

(51) Int. Cl.
*H02P 25/22* (2006.01)
*H02K 1/14* (2006.01)
(Continued)

(52) U.S. Cl.
CPC .............. *H02P 25/22* (2013.01); *B60L 11/14* (2013.01); *B60L 11/1861* (2013.01);
(Continued)

(58) Field of Classification Search
CPC ........ H02K 1/141; H02K 1/148; H02K 1/165; H02K 3/12; H02K 3/28
See application file for complete search history.

(56) References Cited

U.S. PATENT DOCUMENTS 3,909,643 A * 9/1975 Kishima ............ G11B 19/2009
310/156.05
4,220,882 A * 9/1980 Kohzai ................... H02K 23/24
310/186

(Continued)

FOREIGN PATENT DOCUMENTS

EP  0 652 622 A2   5/1995
EP  1 511 160 A2   3/2005
(Continued)

OTHER PUBLICATIONS

First Office Action and English language translation, Chinese Patent Application No. 201480054172.5, dated Jul. 28, 2017, 24 pp.
(Continued)

*Primary Examiner* — Dang Le
(74) *Attorney, Agent, or Firm* — Myers Bigel, P.A.

(57) ABSTRACT

The present application relates to an electric machine (1) including a rotor (13) and a stator (11). The stator has a first set of teeth and each tooth in the first set has a first winding (21) The stator also has a second set of teeth and each tooth in the second set has a second winding (41). The first winding (21) has a first winding count and the second winding (41) has a second winding count. The first and second winding counts are different from each other. The electric machine has particular application in cranking an internal combustion engine. The present application also relates to a related control apparatus (50) and a vehicle.

20 Claims, 9 Drawing Sheets

C-Core machine in starter mode (51) Int. Cl.
*H02K 7/00* (2006.01)
*B60L 11/14* (2006.01)
*B60L 11/18* (2006.01)
*B60L 15/20* (2006.01)
*H02K 1/16* (2006.01)
*H02K 3/12* (2006.01)
*H02K 3/28* (2006.01)
*H02K 21/14* (2006.01)
*H02K 23/52* (2006.01)

(52) U.S. Cl.
CPC ........... *B60L 11/1868* (2013.01); *B60L 15/20* (2013.01); *H02K 1/141* (2013.01); *H02K 1/148* (2013.01); *H02K 1/165* (2013.01); *H02K 3/12* (2013.01); *H02K 3/28* (2013.01); *H02K 7/006* (2013.01); *H02K 21/14* (2013.01); *H02K 23/52* (2013.01); *B60L 2210/10* (2013.01); *B60L 2210/40* (2013.01); *B60L 2220/14* (2013.01); *B60L 2220/50* (2013.01); *B60L 2240/421* (2013.01); *B60L 2240/423* (2013.01); *B60L 2240/662* (2013.01); *B60L 2260/26* (2013.01); *Y02T 10/641* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01); *Y02T 10/7241* (2013.01); *Y02T 10/7275* (2013.01); *Y02T 10/7291* (2013.01); *Y02T 90/16* (2013.01)

(56) References Cited

U.S. PATENT DOCUMENTS

| | | | |
|---|---|---|---|
| 4,812,695 A | 3/1989 | Parshall | |
| 5,432,644 A * | 7/1995 | Tajima | G11B 19/20 310/156.26 |
| 6,078,467 A * | 6/2000 | Akutsu | G11B 17/028 360/99.04 |
| 6,166,469 A * | 12/2000 | Osama | F16C 32/0497 29/596 |
| 6,265,800 B1 * | 7/2001 | Kimura | G11B 19/2009 310/152 |
| 6,794,780 B2 * | 9/2004 | Silber | F16C 32/0465 310/90.5 |
| 7,034,509 B2 | 4/2006 | Kusko | |
| 7,633,205 B2 * | 12/2009 | Hoffmann | H02K 1/165 180/65.51 |
| 8,247,940 B2 * | 8/2012 | Hino | H02K 1/276 310/156.47 |
| 8,485,293 B2 * | 7/2013 | Wagner | B60K 6/48 180/65.265 |
| 2008/0150388 A1 | 6/2008 | Xu | |
| 2009/0033253 A1 | 2/2009 | Nagashima et al. | |
| 2009/0071784 A1 * | 3/2009 | Combs | B60K 6/40 192/3.21 |
| 2011/0185206 A1 | 7/2011 | Castles et al. | |

FOREIGN PATENT DOCUMENTS

| | | |
|---|---|---|
| EP | 1 783 884 A1 | 5/2007 |
| GB | 1 466 565 | 3/1977 |
| GB | 2 389 969 A | 12/2003 |

OTHER PUBLICATIONS

Combined Search and Examination Report, GB 1317307.5, dated Apr. 1, 2014, 9 pages.
Notification of Transmittal of the International Search Report and the Written Opinion, PCT/EP2014/070825, dated Dec. 8, 2014, 11 pages.

* cited by examiner

ELECTRIC MACHINE

TECHNICAL FIELD

The present invention relates to electric machines. In particular but not exclusively the invention relates to electric machines for use as propulsion motors and/or generators for motor vehicles. Aspects of the invention relate to an electric machine, to a stator for an electrical machine, to an electric machine control apparatus and to a vehicle.

BACKGROUND

Internal combustion engines are typically coupled to a starter mechanism for rotating a crankshaft to initiate the combustion cycle and thereby start the engine. The rotation of the crankshaft in this manner is referred to as cranking the engine. In the case of an internal combustion engine for a motor vehicle, the starter mechanism can take the form of an electric starter motor which selectively engages a coupling mechanism to rotate the crankshaft. The starter motor is disengaged once the engine is running to prevent damage.

A hybrid electric vehicle can combine the internal combustion engine with an electric traction machine to generate the motive force for driving the motor vehicle. One approach has been to integrate the electric traction machine into a housing provided in the vehicle driveline. The housing can, for example, be the transmission housing. The electric traction machine can be arranged coaxially with a crankshaft of the internal combustion engine. This arrangement can be referred to as a Crankshaft Integrated Motor Generator (CIMG). A separate electric starter motor can be provided for starting the internal combustion engine; or the CIMG can be used to start the internal combustion engine. The control architectures for both these arrangements will now be described with reference to FIGS. 1 and 2.

Figure 1:
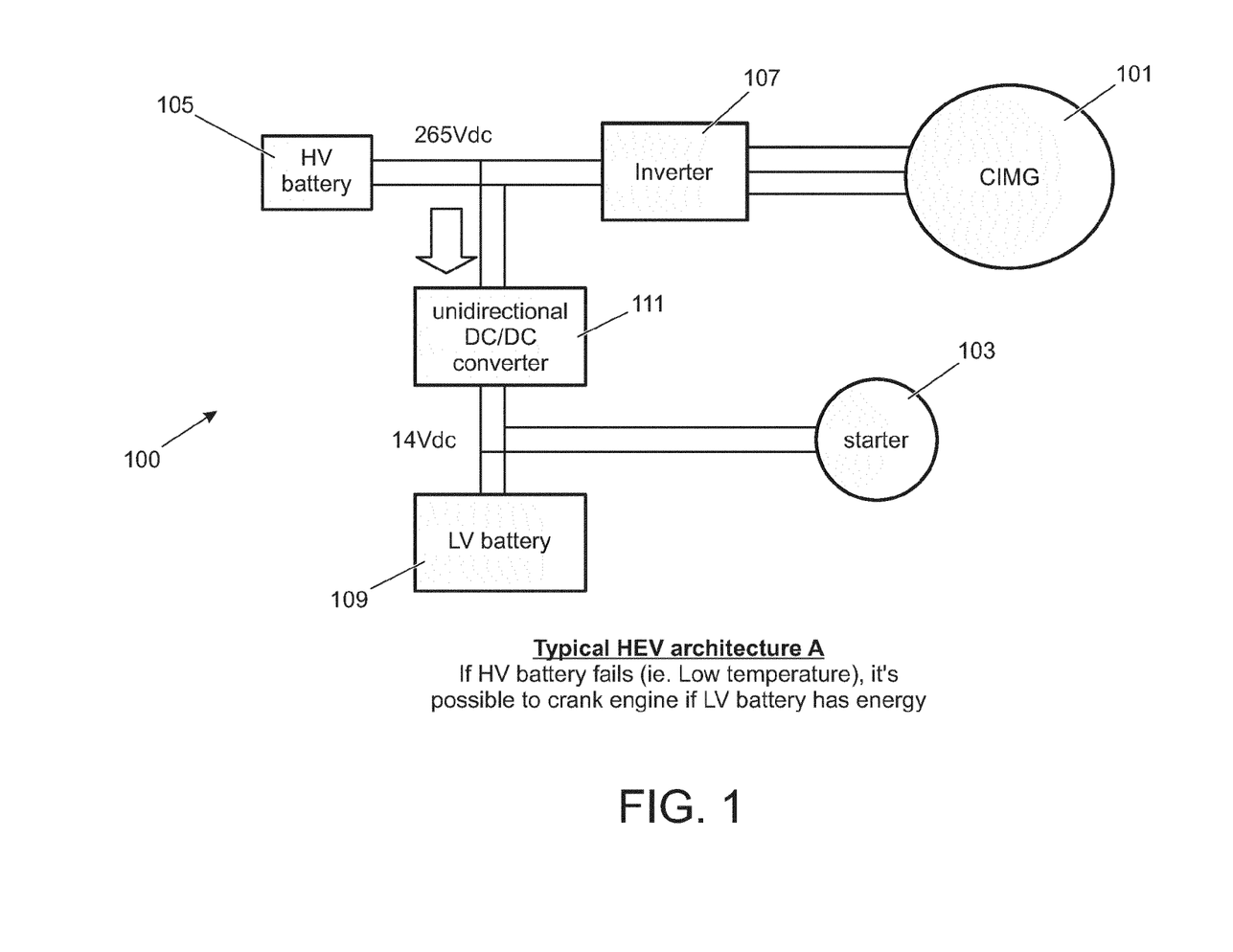
FIG. 1 is a schematic representation of a prior art control apparatus for operating an electric machine and starter motor.
Figure 2A:
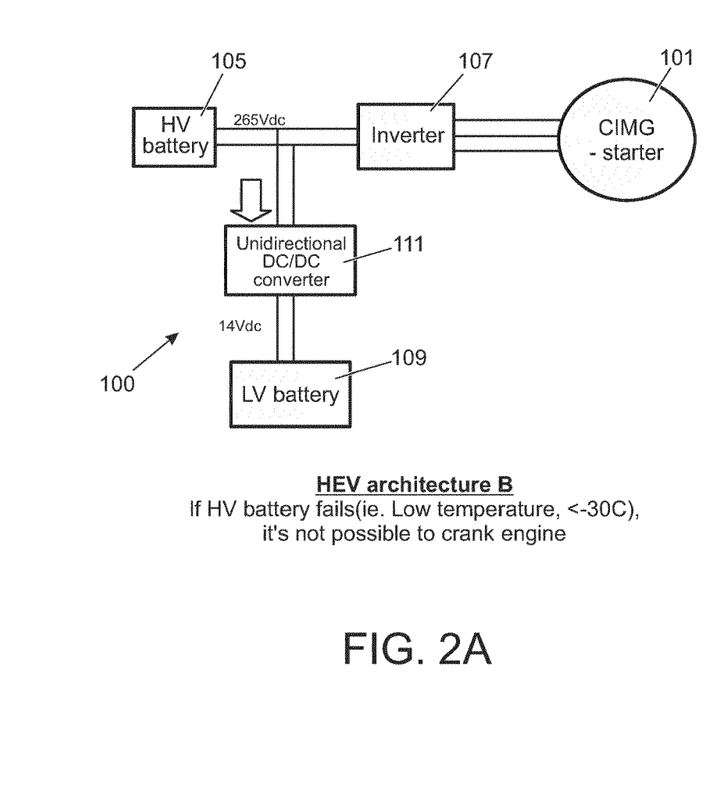
FIGS. 2A and 2B are schematic representations of prior art control apparatus for operating an electric machine to function as a starter motor.
Figure 2B:
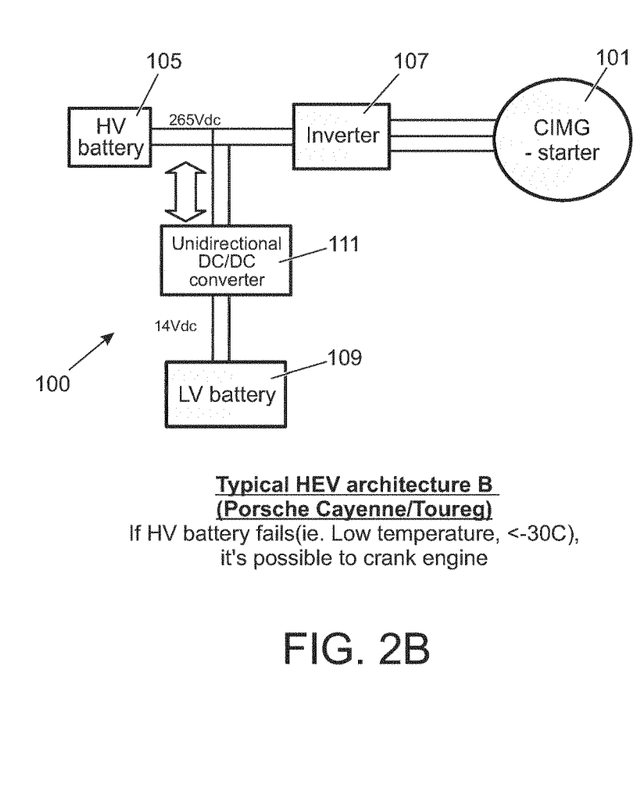

A known control apparatus 100 for a hybrid electric vehicle is shown in FIG. 1. The control apparatus 100 is configured to control a CIMG 101 and a starter motor 103 for starting an internal combustion engine. The CIMG 101 is energized by supplying current from a high voltage battery 105 to an inverter 107 which converts the direct current (DC) supply to a three (3) phase alternating current (AC). A separate low voltage battery 109 is provided for energizing the electric motor in the starter motor 103. A unidirectional DC/DC converter 111 is provided to charge the low voltage battery 109 when the CIMG 101 operates as an alternator. High voltage batteries typically operate poorly at low temperatures and at temperatures below −30° C. their capacity may be reduced to such an extent that they are unable to energize the CIMG 101. Due to their chemical composition, low voltage batteries can typically operate at lower temperatures than high voltage batteries meaning that the starter motor 103 can still operate to crank the engine.

Alternate arrangements of the control apparatus 100 to enable the CIMG 101 to function as both a traction motor and a starter motor are illustrated in FIGS. 2A and 2B. A DC/DC converter 111 is provided to allow the low voltage battery 109 to be charged by the CIMG 101 when operating as an alternator. However, a problem may arise at low temperatures since the capacity of the high voltage battery 105 is reduced. At very low operating temperatures, for example below minus 30° C., there may not be sufficient charge in the high voltage battery 105 to energize the combined CIMG 101. If the DC/DC convertor 111 is a unidirectional converter (as shown in FIG. 2A), it is not possible to crank the internal combustion engine at low temperatures since the high voltage battery 105 is unable to energize the CIMG 101. To overcome this limitation, a bidirectional DC/DC converter 111 must be utilised (as shown in FIG. 2B) to enable the low voltage battery 109 to energise the CIMG 101.

The need to provide a starter motor 103 to supplement the electric traction machine 101 is undesirable. However, this arrangement is required with known apparatus to enable the internal combustion engine to be started even when the high voltage battery is unable to energize the CIMG 101, for example due to low operating temperatures. The alternate arrangement in which the CIMG 101 also functions as a starter motor requires the use of a bidirectional DC/DC converter 111. However, the bidirectional DC/DC converter 111 typically increases the cost and complexity of the control apparatus 100.

At least in certain embodiments the present invention sets out to overcome or ameliorate at least some of the shortcomings of the prior art arrangements.

SUMMARY OF THE INVENTION

Aspects of the invention relate to an electric machine, to a stator for an electrical machine, to an electric machine control apparatus and to a vehicle.

According to a further aspect of the present invention there is provided an electric machine comprising a rotor and a stator, wherein the stator comprises:
 a first set of teeth, each tooth in the first set having a first winding; and
 a second set of teeth, each tooth in the second set having a second winding;
 wherein said first winding and said second winding are different from each other.

In an embodiment the first and second windings can be selectively energized independently of each other.

In use, the first and second windings can be configured to generate respective first and second magnetic fluxes when they are energized. The resulting first and second magnetic fluxes can differ from each other. By incorporating different windings, the first and second windings can be selectively energized to generate different outputs for the electric machine, such as different operating speeds and/or output torques. The first winding can be configured to generate a traction force suitable for propelling a vehicle. The second winding can be configured to generate a cranking force suitable for cranking an internal combustion engine. In use, the first and second windings can be energized separately or together.

The first winding can have a first winding count and the second winding can have a second winding count. The first and second windings can differ from each other by virtue of the first and second winding counts being different from each other. By way of example, the first winding can have a first winding count of seven (7) turns and the second winding can have a second winding count of forty (40) turns. The second winding can, for example, have at least two, three, four or five times as many turns as the first winding.

Alternatively, or in addition, the first winding can be formed from a different material than the second winding. The first winding can be wound from a first material and the second winding can be wound from a second material. The first and second materials can have different properties, for example different magnetic permeabilities. Alternatively, or in addition, the first and second windings can be wound from first and second coils having different thicknesses. Alternatively, or in addition, the first and second windings can have different cross-sections. For example, the cross section of the teeth in said first and second sets can differ from each other.

The stator can comprise first and second arcuate segments. The first set of teeth can be divided between said first and second arcuate segments. The first and second arcuate segments can be disposed diametrically opposite each other. The first windings in each of said first and second arcuate segments can be in opposition to each other.

The teeth in the stator can have an angular spacing equivalent to that of a circular stator of equivalent diameter having twenty-seven (27) teeth. The first and second arcuate segments can each comprise nine (9) teeth. A first circumferential offset can be provided between said first and second arcuate segments on a first side of the stator; and a second circumferential offset can be provided between said first and second arcuate segments on a second side of the stator. The first and second circumferential offsets can be arranged diametrically opposite each other.

The equivalent of four and a half (4½) teeth is removed from diametrically opposed positions on the circumference of the stator. In order for the first and second arcuate segments to be positioned diametrically opposite each other to balance operating forces, one of the arcuate segments is rotated by an angle equivalent to half the stator tooth pitch (6.65° in the stator configuration having twenty-seven (27) stator teeth); and the coils provided on one of the segments are reversed in relation to the coils on the other segment. The first and second circumferential offsets are thereby arranged diametrically opposite to one another. This stator configuration is believed to be patentable independently.

In the case of a three phase electric machine, the first segment can be wound as +A +B +C +A +B +C +A +B +C; and the second segment can be wound as −A −B −C −A −B −C −A −B −C.

At least in certain embodiments, a third segment can be disposed in the first circumferential offset or the second circumferential offset. The third segment can comprise three (3) teeth having phases A' B' C' as well as a return flux tooth disposed at each circumferential end thereof.

The rotor can comprise eighteen (18) poles evenly spaced about its circumference.

In an alternate arrangement, the stator can comprise a C-shaped segment. The teeth can extend radially inward from an outer C-shaped element. The first set of teeth can be divided into first and second groups within said C-shaped segment. The first and second groups can be diametrically opposite each other within the C-shaped segment.

The second set of teeth can be arranged in a third group within said C-shaped segment. The third group can be disposed between said first and second groups. The third group of teeth can be arranged in an arcuate segment disposed diametrically opposite a circumferential aperture formed in said C-shaped segment.

The first and second groups can each comprise nine (9) teeth; and the third group can comprise six (6) teeth.

The C-shaped segment can comprise twenty-four (24) teeth having an angular spacing equivalent to that of a circular stator of equivalent diameter having thirty (30) teeth. The rotor can comprise twenty (20) poles evenly spaced about its circumference.

The second winding count can be selected to generate a cranking force for rotating a crankshaft of an internal combustion engine when the second winding is energized. The first and second windings can be formed from wire having different properties, for example having different diameters or formed from different materials.

The electric machine can be a permanent magnet synchronous motor. Alternatively, the electric machine can be a switched reluctance electric machine.

In an embodiment a thickness of the teeth in the first set of teeth may be different from a corresponding thickness of the teeth in the second set of teeth. For example the teeth in the second set of teeth may be thicker in the circumferential plane of the stator than those in the first set of teeth, or the teeth in the second set of teeth may be thinner in a direction parallel to the axis of rotation of the rotor than the teeth in the first set of teeth. In this embodiment the first and second windings may be different by virtue of the difference in the thickness of the teeth that they are wound on.

According to a further aspect of the present invention, there is provided a control apparatus for controlling an electric machine as claimed in any one of the preceding claims, wherein the control apparatus comprises:
    a first inverter for supplying alternating current to the first winding on each tooth in said first set; and
    a second inverter for supplying alternating current to the second winding on each tooth in said second set.

The first inverter can be suitable for coupling to a high voltage battery. The second inverter can be suitable for coupling to a low voltage battery.

The control apparatus can comprise a unidirectional DC/DC converter disposed between the first inverter and the low voltage battery. The second inverter can be coupled directly to said second winding, thereby bypassing the DC/DC converter.

According to a further aspect of the present invention there is provided a vehicle comprising an electric machine as described herein. The vehicle can comprise an internal combustion engine for use in combination with the electric machine. The electric machine can be coupled to a crankshaft of the internal combustion engine. The can include control apparatus as described herein.

According to a still further aspect of the present invention there is provided a stator for an electric machine, the stator comprising:
    a first set of teeth each having a first winding; and
    a second set of teeth each having a second winding;
        wherein said first winding and said second winding are different from each other.

The first winding can have a first winding count and the second winding can have a second winding count. The first and second windings can differ from each other by virtue of the first and second winding counts being different from each other. By way of example, the first winding can have a first winding count of seven (7) turns and the second winding can have a second winding count of forty (40) turns. The second winding can, for example, have at least two, three, four or five times as many turns as the first winding.

Alternatively, or in addition, the first winding can be formed from a different material than the second winding. The first winding can be wound from a first material and the second winding can be wound from a second material. The first and second materials can have different properties, for example different magnetic permeabilities. Alternatively, or in addition, the first and second windings can be wound from first and second coils having different thicknesses. Alternatively, or in addition, the first and second windings can have different cross-sections. For example, the cross section of the teeth in said first and second sets can differ from each other.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the present invention will now be described, by way of example only, with reference to the accompanying figures, in which.

DETAILED DESCRIPTION

An electric machine 1 suitable for a hybrid electric vehicle (not shown) in accordance with embodiments of the present invention will now be described by way of example only. The electric machine 1 has particular application in combination with an internal combustion engine (not shown).

The electric machine 1 is configured selectively to operate in a cranking mode and in a traction mode. When operating in the cranking mode, a cranking force is generated which is sufficient to rotate a crankshaft of the internal combustion engine to initiate a combustion cycle. When operating in the traction mode, a traction force is generated to propel the hybrid electric vehicle. The electric machine 1 can operate in the traction mode to provide the sole tractive force for propelling the vehicle, or it can operate in conjunction with the internal combustion engine.

Figure 3:
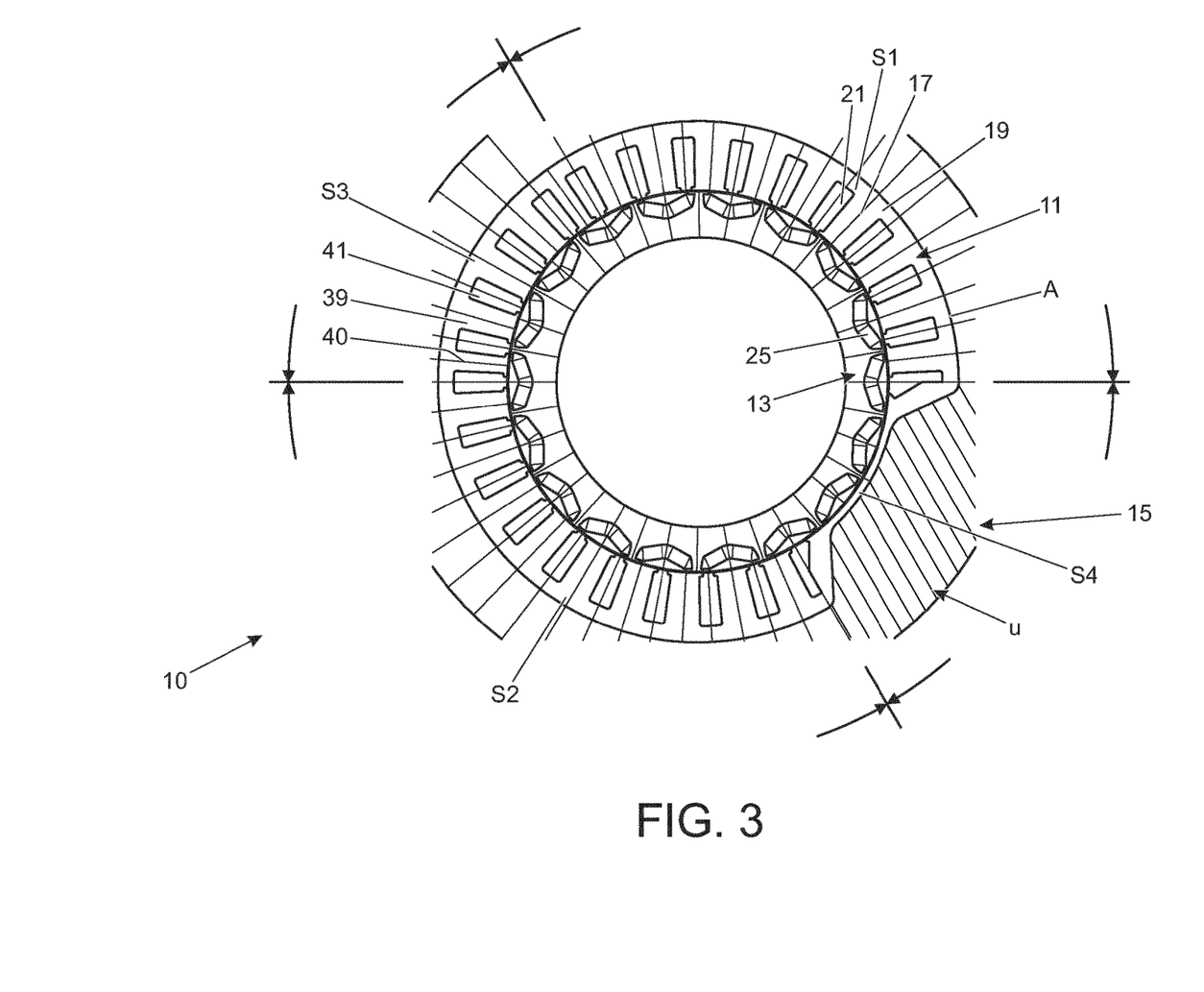
FIG. 3 is a schematic representation of an electric machine according to a first embodiment of the present invention installed in a restricted package space.

As shown in FIG. 3, the electric machine 1 comprises a permanent magnet synchronous motor (PMSM) 10 which operates in three (3) phases. The PMSM 10 comprises a fixed stator 11 and a rotor 13. The PMSM 10 is installed in a package 15 provided by a portion of a motor vehicle component, such as a transmission housing. The package 15 has an available package space A that is not occupied by the PMSM 10. A section U of the package 15 (shown as a shaded area) extends into a central region inset from a radially outer edge of the stator 11. The section U corresponds to an internal volume of the component 15 that is unavailable to house the stator or rotor of the PMSM 10. The section U can, for example, represent one or more assemblies or machines, such as a power transfer unit or a starter motor, which impinge on the PMSM 10.

The stator 11 of the PMSM 10 is substantially circular and is fixedly mounted to the component 15. The stator 11 has a segmented configuration and comprises four segments S1-S4. In the present embodiment, the first and second segments S1, S2 are provided at diametrically opposed locations about the rotor 13. The first and second segments S1, S2 each have an arcuate profile and are arranged co-axially with the rotor 13. The third segment S3 is positioned between the first and second segments S1, S2. The segments S1-S4 each comprise a plurality of laminations arranged in face-to-face contact with each other. The laminations can, for example, be made of electrical steel. The segments S1-S4 could be formed integrally with each other, for example in the form of a continuous ring. Alternatively, the segments S1-S4 could be formed independently and then joined together. For example, each segment S1-S4 could be assembled from a plurality of laminations and then the individual segments S1-S4 assembled to form the stator 11. The individual segments S1-S4 could, for example, be mounted to each other or supported in a frame or housing.

The first and second segments S1, S2 each extend over 120° and have nine (9) stator teeth 17 projecting radially inwardly from an outer ring segment 19. The angular spacing of the stator teeth 17 is equivalent to that of a circular stator of equivalent diameter having twenty-seven (27) teeth. A set of first windings 21 is provided around each of the stator teeth 17 of the first and second segments S1, S2 to support three (3) phase operation. A magnetic flux is generated when an electric current is passed through the first windings 21. In the present embodiment the first windings 21 are concentrated windings comprising separate coils wound on each stator tooth 17. As described herein with reference to FIG. 6, the electric machine 1 comprises a first control unit 23 for supplying current to the first windings 21 to control operation of the PMSM 10.

The rotor 13 is substantially circular and is located coaxially of the stator 11. The rotor 13 is free to rotate within the stator 11. The rotor 13 comprises eighteen (18) poles 25 having uniform angular spacing around the rotor 13. Thus, the rotor pole pitch is 20° in the present embodiment. The poles 25 can, for example, be made of rare-earth materials to provide a high density of magnetic flux. The poles 25 can each be formed by one or more permanent magnets.

The PMSM 10 according to this embodiment has a stator tooth to rotor pole ratio equivalent to 27/18 (although in practice the stator has eighteen (18) stator teeth 17).

The first and second segments S1, S2 are arranged diametrically opposite from one another and are wound in opposition. The first segment S1 is wound as +A +B +C +A +B +C +A +B +C; and the second segment S2 is wound as −A −B −C −A −B −C −A −B −C. A first angular offset is formed between the first and second segments S1, S2 on a first side of the stator 11 equivalent to four and a half (4½) stator teeth 17. A second angular offset is formed between the first and second segments S1, S2 on a second side of the stator 11 equivalent to four and a half (4½) stator teeth 17. In order to balance the operational loads and enable full operational performance, one of the segments S1, S2 is then rotated by an angle equal to half a stator pole pitch (6.665° in the present configuration). In the present embodiment, this further rotation reduces the first angular offset. The first and second segments S1, S2 are thereby offset from each other by 60°. The windings provided on one of the segments S1, S2 are reversed in relation to the coils on the other of said segments S1, S2.

The first control unit 23 comprises a first electronic controller (not shown) for sequencing the supply of current to the first windings 21 on the stator teeth 17 of the first and second segments S1, S2. The supply sequence is the same as a conventional three (3) phase PMSM having a circular stator. The first windings 21 are electrically coupled to a high voltage (HV) battery 31 via a first inverter 51.

As illustrated in FIG. 3, third and fourth segments S3, S4 are disposed between the first and second segments S1, S2. Specifically, the third segment S3 is disposed in said first angular offset; and the fourth segment S4 is disposed in said second angular offset. The third and fourth segments S3, S4 each extend over 60° in the present embodiment to complete the 360° geometry of the stator 11. The third and fourth segments S3, S4 can function as a means to balance the stator phase back electromotive force (EMF). The third and fourth segments S3, S4 are formed from a plurality of laminations arranged in face-to-face contact with each other. The laminations can, for example, be made of electrical steel.

The third segment S3 comprises three (3) radially inwardly extending cranking teeth 39 and a pair of radial shield elements 40. The third segment S3 functions as a cranking segment to assist with starting of the internal combustion engine coupled to the PMSM 10. The radial shield elements 40 are disposed at the circumferential ends of the third segment S3 and each have a width equal to half the width of a stator tooth 17. The fourth segment S4 takes the form of a circumferential shield element 33 for inhibiting the transmittal of magnetic flux from the poles 25 into the package 15.

A set of second windings 41 is provided on each of the three cranking teeth 39 of the third segment S3. The second windings 41 on each cranking tooth 39 have a different turn count than the first windings 21 provided on the stator teeth 17 of the first and second segments S1, S2. A second control unit 43 is provided for supplying current to the second windings 41. The second windings 41 can be fed from/feed into an alternate supply which in the present embodiment is a low voltage (LV) battery 45. The second windings 41 are electrically coupled to the low voltage (HV) battery 45 via a second inverter 55. The second control unit 43 comprises a second electronic controller (not shown) for supplying a second three (3) phase current to the second windings 41 to generate a magnetic flux for drivingly rotating the rotor 13.

The current supplied to the first and second windings 21, 41 can be controlled independently by the respective first and second control units 23, 43. Thus, the first and second windings 21, 41 can be selectively energized independently of each other. The first and second control units 23, 43 can selectively energize either the first winding 21 or the second winding 41; or energize both the first and second windings 21, 41 simultaneously. In an alternate arrangement, when operating in said cranking mode, the first and second control units 23, 43 can be configured to energize only the second winding 41. The second winding 41 can be selectively energized to generate a magnetic flux which supplements the magnetic flux generated by the first winding 21. The total torque delivered by the PMSM 10 can thereby be increased by energizing the second winding 41. When operating in the cranking operating mode, the first and second windings 21, 41 are energized to crank the internal combustion engine. During the traction operating mode, only the first winding 21 is typically energized. It will be appreciated that the first and second windings 21, 41 could selectively be energized in the traction mode, for example to provide a boost function.

Figure 4:
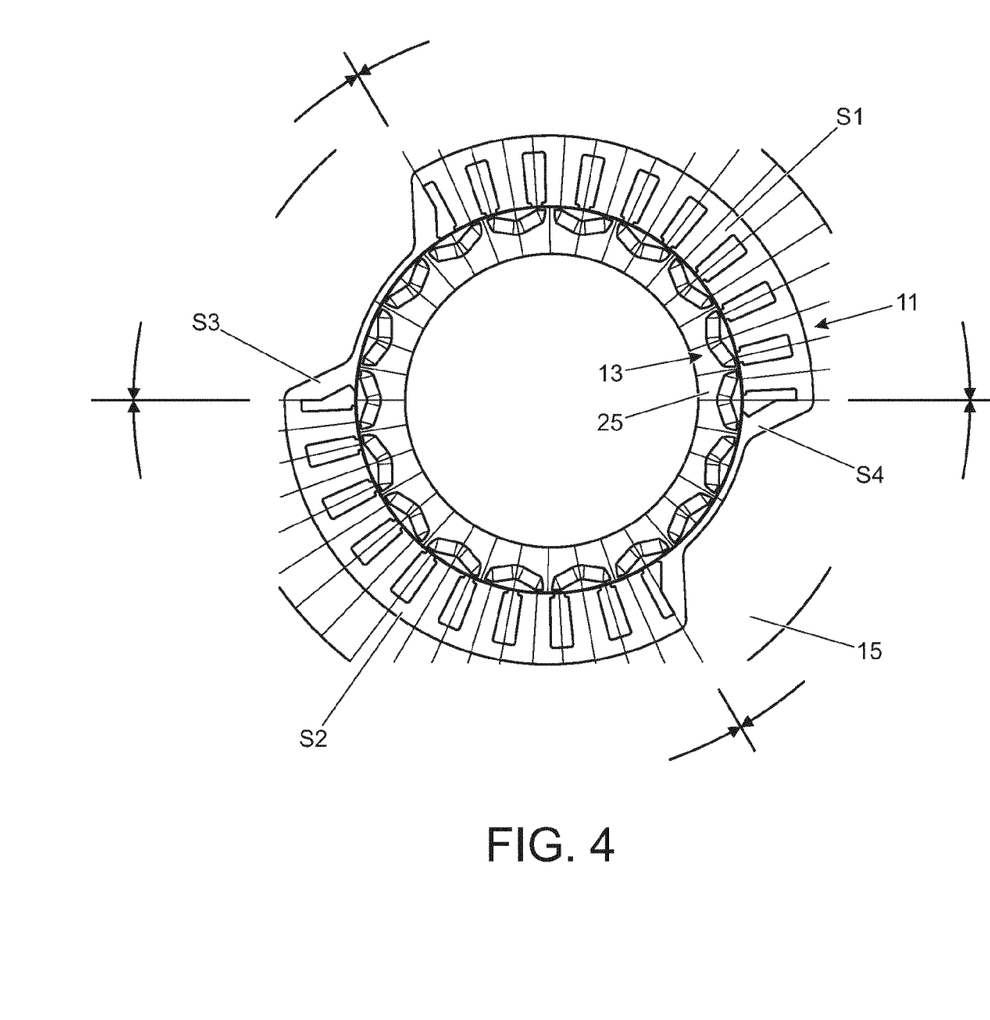
FIG. 4 is a schematic representation of a modified electric machine according to the first embodiment.

A modified arrangement of the PMSM 10 is illustrated in FIG. 4. In this arrangement, the third and fourth segments S3, S4 both take the form of circumferential shield elements for inhibiting the transmittal of magnetic flux from the poles 25 into the package 15. The alignment of the first and second segments S1, S2 is the same as the arrangement described above. Again, the third and fourth segments S3, S4 could be formed integrally with the first and second segments S1, S2 (for example, forming a continuous ring) or each segment S1-S4 could be formed separately and then mounted to the adjacent segment to form the assembled stator 11.

It will be appreciated that the first winding 21 and/or the second winding 41 can be selectively coupled to an electrical load and function as an alternator.

Figure 5A:
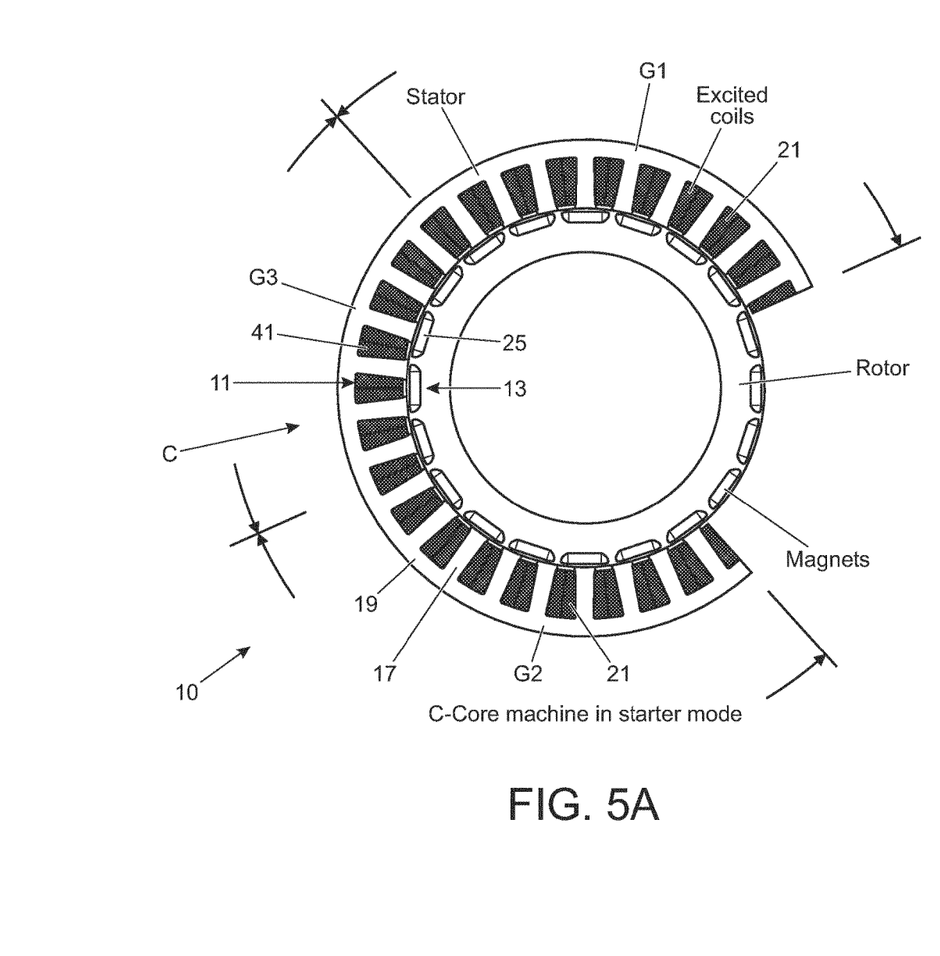
FIGS. 5A and 5b are schematic representations of an electric machine according a second embodiment of the present invention.
Figure 5B:
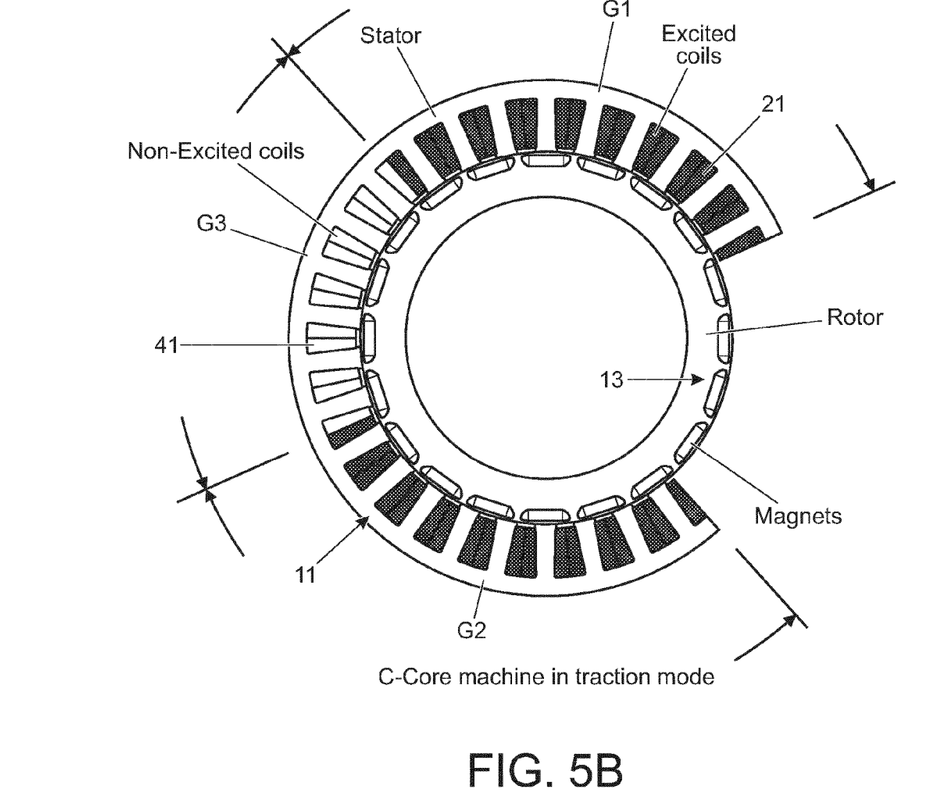

A PMSM 10 according to a second embodiment will now be described with reference to FIGS. 5A and 5B. Like reference numerals are used for like components. This embodiment has particular application where there is an increased emphasis on providing starting assist for the internal combustion engine.

The PMSM 10 according to the second embodiment comprises a stator 11 consisting of a C-shaped segment C carrying twenty-four (24) teeth 17. As described herein, the teeth 17 are arranged in three groups G1, G2, G3. The C-shaped segment C is made up of a plurality of laminations arranged in face-to-face contact with each other. The teeth 17 project radially inwardly from an outer ring segment 19. The teeth 17 and the outer ring segment 19 are formed integrally from said laminations. The angular spacing of the stator teeth 17 is equivalent to that of a circular stator of equivalent diameter having thirty (30) teeth. As shown in FIGS. 5A and 5B, the C-shaped segment C extends over 288° leaving an aperture extending over 72° (equivalent to six (6) teeth 17). A circumferential shield element (not shown) could optionally be provided to close said aperture.

A set of first windings 21 is provided on each tooth disposed within the first and second groups G1, G2 of diametrically opposed teeth 17 within the C-shaped segment C. The first and second groups G1, G2 each consist of nine (9) teeth 17 and are equivalent to the first and second segments S1, S2 of the first embodiment. A set of second windings 41 is provided on each tooth in the third group G3 of teeth 17 which is disposed between the first and second groups G1, G2 and diametrically opposite the aperture. The third group G3 consists of six (6) teeth 17 and is equivalent to the third segment S3 of the first embodiment. The first winding 21 has a different turn count from the second winding 41. The first and second windings 21, 41 are energized by respective first and second control units 23, 43.

The teeth in the third group may have a different geometry to the teeth in the first and second groups, for example the teeth in the third group may be thicker in the circumferential plane of the stator than those in the first and second groups, or the teeth in the third group may be thinner in a direction parallel to the axis of rotation of the rotor. The geometry of the teeth in the third group may be selected to reduce the amount of wire required, whilst providing sufficient cranking force to start the internal combustion engine.

The rotor 13 is substantially circular and is located coaxially of the stator 11. The rotor 13 comprises twenty (20) poles 25 having uniform angular spacing around the rotor 13. Thus, the rotor pole pitch is 18°. The poles 25 can, for example, be made of rare-earth materials to provide a high density of magnetic flux. The poles 25 can each be formed by one or more permanent magnets.

The PMSM 10 according to the second embodiment has a stator tooth to rotor pole ratio equivalent to 30/20 (although as described herein the stator comprises an interrupted C-shaped segment having twenty-four (24) stator teeth 17).

The operation of the PMSM 10 according to the second embodiment will now be described. The cranking operating mode of the PMSM 10 is illustrated in FIG. 5A with the energized windings 21, 41 shown as shaded. In this cranking operating mode, the first and second control units 23, 43 energize both the first and second windings 21, 41. Thus, a magnetic flux is generated by the first and second windings 21, 41 provided on the teeth 17 in each of the first, second and third groups G1, G2, G3. The PMSM 10 delivers sufficient output torque to rotate the crankshaft of the internal combustion engine, thereby enabling the combustion cycle to be initiated and the engine to be started. Once the internal combustion engine has been started, the PMSM 10 can switch to the traction operating mode in which the second control unit 43 de-energizes the second winding 41 so that only the first winding 21 is energized. Consequently, a magnetic flux is generated only by the second windings 41 provided on the teeth 17 in the first and second groups G1, G2. The traction operating mode is illustrated in FIG. 5B with the de-energized windings 21 of the cranking segment 37 shown un-shaded. The transverse forces acting on the rotor 11 are balanced by the first and second segments S1, S2 when the PMSM 10 is in said traction operating mode.

Figure 6:
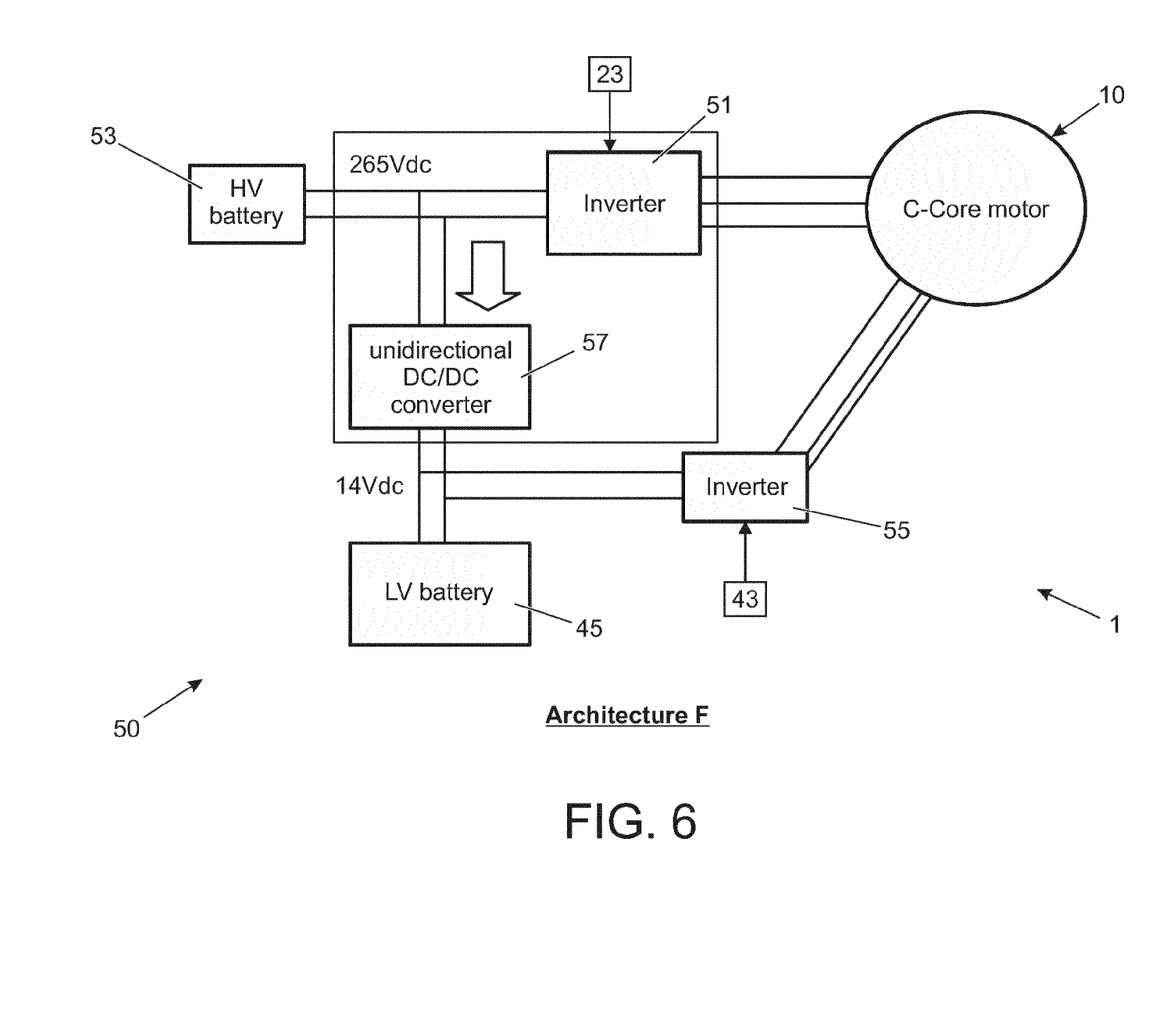
FIG. 6 is a schematic representation of a first control apparatus for the electric machine according to the present invention.

As described herein, first and second electronic control units 23, 43 are provided for controlling the supply of current to the first and second windings 21, 41. At least according to certain aspects of the present invention, the PMSM 10 enables a novel control apparatus 50 to be implemented, as shown in FIG. 6. The control apparatus 50 comprises the first inverter 51 coupled to a high voltage battery 53 (for example 265Vdc) for energising the first and second windings 21, 41; and the second inverter 55 coupled to the low voltage battery 45 (for example 265Vdc) for energising the cranking segment 37. A unidirectional DC/DC converter 57 is provided between the first inverter 51 and the low voltage battery 45 to enable charging of the low voltage battery 45. The first and second inverters 51, 55 and the DC/DC converter 57 can be incorporated into a power supply unit. The first and second electronic controllers 23, 43 control operation of the first and second inverters 51, 55 respectively.

Figure 7:
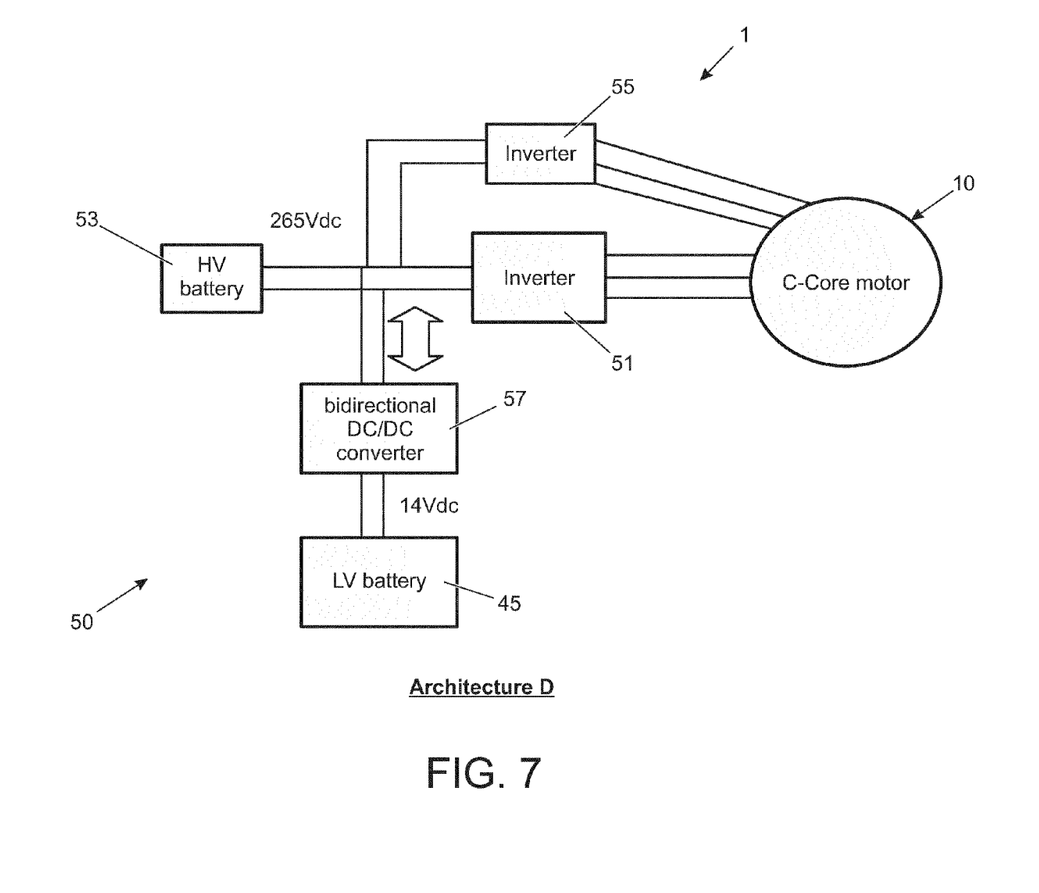
FIG. 7 is a schematic representation of a second control apparatus for the electric machine according to the present invention.

An alternate arrangement of the control apparatus 50 is illustrated in FIG. 7. The control apparatus 50 according to this arrangement comprises a bidirectional DC/DC converter 57 disposed between the low voltage battery 45 and the first and second inverters 51, 55.

Rather than provide a concentrated winding 21, 41 on the stator teeth 17 and/or the cranking teeth 39, a distributed winding could be provided. Moreover, the angular extent and/or the angular offset of the first and second segments S1, S2 may vary in alternate embodiments.

It will be understood that the stator 11 can comprise more than two segments S arranged to balance the forces applied to the rotor 13. The segments S can be arranged within the stator 11 in diametrically opposing positions.

Figure 8:
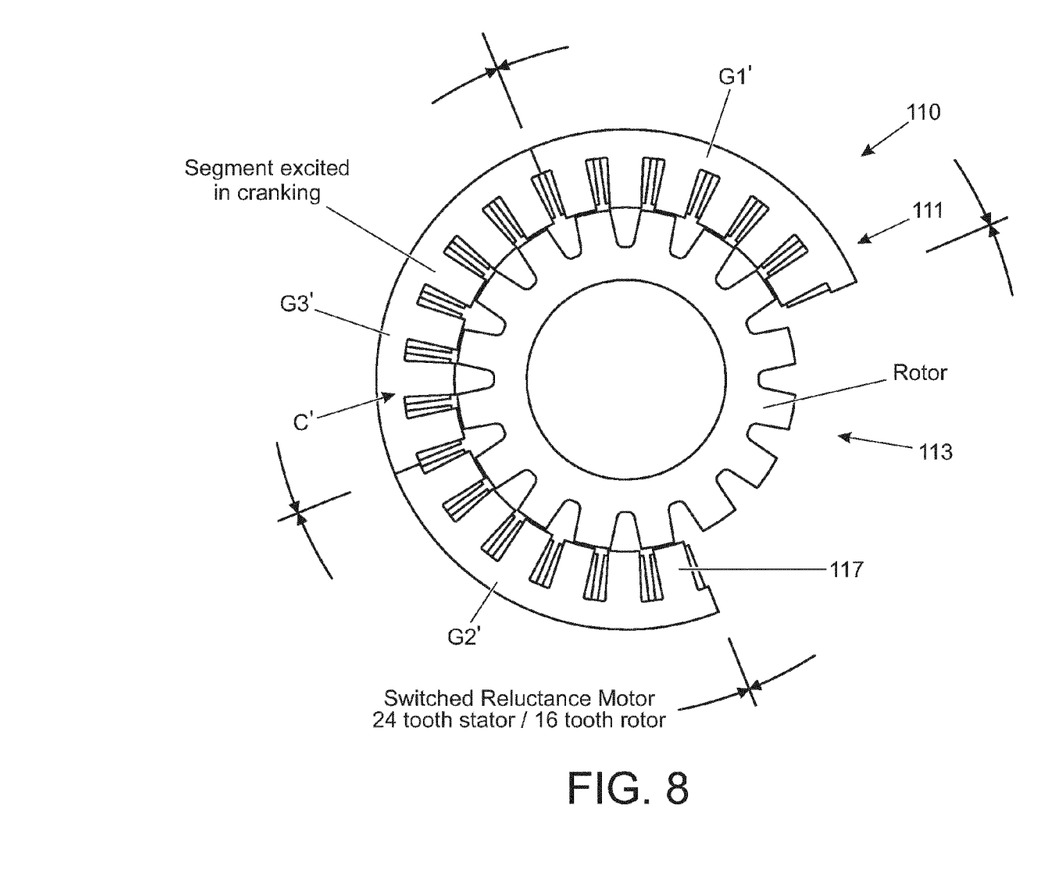
FIG. 8 is a schematic representation of a switched reluctance electric machine according to a third embodiment of the present invention.

A switched reluctance (SR) electric machine 110 according to a third embodiment of the present invention is shown in FIG. 8. Like reference numerals will be used for like components, albeit incremented by 100 to aid clarity.

The SR electric machine 110 comprises a stator 111 and a rotor 113. The stator 111 consists of a C-shaped segment C' carrying eighteen (18) stator teeth 117. As described herein, the stator teeth 117 are arranged in three groups G1', G2', G3', each group comprising six (6) teeth 117. The C-shaped segment C' is made up of a plurality of laminations arranged in face-to-face contact with each other.

The stator teeth 117 project radially inwardly from an outer ring segment 119. The stator teeth 117 and the outer ring segment 19 are formed integrally from said laminations. The angular spacing of the stator teeth 17 is equivalent to that of a circular stator of equivalent diameter having twenty-four (24) teeth. The C-shaped segment C extends over 270° leaving an aperture extending over 90° (equivalent to six (6) stator teeth 117). A circumferential shield element (not shown) could optionally be provided to close said aperture.

A set of first windings 121 is provided on each stator tooth 117 disposed within the first and second groups G1, G2 of diametrically opposed teeth 117 within the C-shaped segment C'. The first and second groups G1', G2' each consist of six (6) stator teeth 117 and are equivalent to the first and second segments S1, S2 of the second embodiment described herein. A set of second windings 141 is provided on each tooth in the third group G3' of stator teeth 117 which is disposed between the first and second groups G1', G2; and diametrically opposite the aperture. The third group G3' also consists of six (6) stator teeth 117 and is equivalent to the third segment S3 of the second embodiment. The first winding 121 has a different turn count from the second winding 141. The first and second windings 121, 141 are energized by respective first and second control units 123, 143. The rotor 113 is located coaxially of the stator 111 and comprises sixteen (16) rotor teeth 159.

In the present embodiment, the three groups G1', G2', G3' are formed integrally with each other from a plurality of C-shaped laminations. In an alternate arrangement, the groups G1', G2', G3' can each be formed as a separate segment (for example each segment comprising a plurality of arcuate laminations) which are then assembled to form the stator 111. The separate segments could, for example, be mounted to each other or to supported in a frame or housing.

The stator described herein can be utilised in different types of electrical machine. For example, the stator could be implemented in a switched reluctance electric machine; an axial flux electric machine; a radial flux electric machine and so on.

Electric machines according to embodiments of the present invention may have any suitable number of stator segments such as 1, 2, 3, 4, 5 or more.

It will be appreciated that the first and second control units 23, 43 described herein could be combined into a single controller. The controller could, for example, comprise separate outputs for the first and second windings 21, 41.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, described in conjunction with a particular aspect, embodiment or example of the invention are to be understood to be applicable to any other aspect, embodiment or example described herein unless incompatible therewith.

Further aspects of the present invention are described in the following numbered paragraphs:

1. An electric machine comprising a rotor and a stator, wherein the stator comprises:
   a first set of teeth, each tooth in the first set having a first winding; and
   a second set of teeth, each tooth in the second set having a second winding;
   wherein said first winding and said second winding are different from each other.

2. An electric machine as described in paragraph 1, wherein said first winding has a first winding count and said second winding has a second winding count, the first and second winding counts being different from each other.

3. An electric machine as described in paragraph 1, wherein said stator comprises first and second arcuate segments; the first set of teeth being provided in said first and second arcuate segments.

4. An electric machine as described in paragraph 3, wherein said first and second arcuate segments are disposed diametrically opposite each other.

5. An electric machine as described in paragraph 4, wherein the first windings in each of said first and second arcuate segments are in opposition to each other.

6. An electric machine as described in paragraph 3, wherein said first and second arcuate segments each comprise nine (9) teeth having an angular spacing equivalent to that of a circular stator of equivalent diameter having twenty-seven (27) teeth.

7. An electric machine as described in paragraph 6, wherein a first circumferential offset is provided between said first and second arcuate segments equivalent to four and a half teeth whole; and a second circumferential offset is provided between said first and second arcuate segments equivalent to four and a half teeth; and one of the first and second arcuate segments is angularly rotated by an angle equal to half a start pole pitch for balancing operational loads.

8. An electric machine as described in paragraph 7, wherein said rotor comprises eighteen (18) poles evenly spaced about its circumference.

9. An electric machine as described in paragraph 1, wherein said stator comprises a C-shaped segment; and the first set of teeth are arranged in a first group and a second group within said C-shaped segment, the first and second groups being diametrically opposite each other.

10. An electric machine as described in paragraph 9, wherein said second set of teeth are arranged in a third group within said C-shaped segment, said third group being disposed between said first and second groups.

11. An electric machine as described in paragraph 10, wherein said first and second groups each comprise nine (9) teeth; and said third group comprises six (6) teeth.

12. An electric machine as described in paragraph 11, wherein said rotor comprises twenty (20) poles evenly spaced about its circumference.

13. An electric machine as described in paragraph 1, wherein said second winding count is selected to generate a cranking force for rotating a crankshaft of an internal combustion engine when the second winding is energized.

14. An electric machine as described in paragraph 1, wherein the electric machine is a permanent magnet synchronous motor.

15. A control apparatus for controlling an electric machine as described in any one of the preceding paragraphs, wherein the control apparatus comprises:
   a first inverter for supplying alternating current to the first winding on each tooth in said first set; and
   a second inverter for supplying alternating current to the second winding on each tooth in said second set.

16. A control apparatus as described in paragraph 15, wherein said first inverter is suitable for coupling to a high voltage battery; and the second inverter is suitable for coupling to a low voltage battery.

17. A control apparatus as described in paragraph 16 comprising a unidirectional DC/DC converter disposed between the first inverter and the low voltage battery.

18. A vehicle comprising an electric machine as described in paragraph 1.

19. A vehicle as described in paragraph 18, wherein the electric machine is coupled to a crankshaft of an internal combustion engine.

20. A vehicle as described in paragraph 18 comprising a control apparatus as described in paragraph 15.

21. A stator for an electric machine, the stator comprising:
   a first set of teeth each having a first winding; and
   a second set of teeth each having a second winding;
   wherein said first winding and said second winding are different from each other.

22. An electric machine as described in paragraph 21, wherein said first winding has a first winding count and said second winding has a second winding count, the first and second winding counts being different from each other.

The invention claimed is:

1. An electric machine comprising a rotor and a stator, wherein the stator comprises:
   a first set of teeth, each tooth in the first set having a first winding; and
   a second set of teeth, each tooth in the second set having a second winding;
   wherein the first and second windings are different from each other, and wherein the first and second windings are configured to be selectively energized independently of each other, and
   wherein the stator comprises a C-shaped segment, wherein the first set of teeth are arranged in a first group and a second group within the C-shaped segment, and wherein the first and second groups are diametrically opposite each other.

2. The electric machine of claim 1, wherein the first winding has a first winding count and the second winding has a second winding count that is different from the first winding count.

3. The electric machine of claim 1, wherein the stator comprises first and second arcuate segments, and wherein the first set of teeth are provided in the first and second arcuate segments.

4. The electric machine of claim 3, wherein the first and second arcuate segments are disposed diametrically opposite each other.

5. The electric machine of claim 4, wherein the first windings in each of the first and second arcuate segments are in opposition to each other.

6. The electric machine of claim 3, wherein the first and second arcuate segments each comprise nine (9) teeth having an angular spacing equivalent to that of a circular stator of equivalent diameter having twenty-seven (27) teeth.

7. The electric machine of claim 6, wherein a first circumferential offset is provided between the first and second arcuate segments equivalent to four and a half teeth whole, wherein a second circumferential offset is provided between the first and second arcuate segments equivalent to four and a half teeth, and wherein one of the first and second arcuate segments is angularly rotated by an angle equal to half a start pole pitch for balancing operational loads.

8. The electric machine of claim 7, wherein the rotor comprises eighteen (18) poles evenly spaced about a circumference of the rotor.

9. The electric machine of claim 1, wherein the second set of teeth are arranged in a third group within the C-shaped segment, and wherein the third group is disposed between the first and second groups.

10. The electric machine of claim 1, wherein the second winding count is selected to generate a cranking force for rotating a crankshaft of an internal combustion engine when the second winding is energized.

11. The electric machine of claim 1, wherein the electric machine is a permanent magnet synchronous motor.

12. The electric machine of claim 1, wherein a thickness of the teeth in the first set of teeth is different from a corresponding thickness of the teeth in the second set of teeth.

13. The electric machine of claim 1, further comprising a control apparatus configured to control the electric machine, wherein the control apparatus comprises:
    a first inverter for supplying alternating current to the first winding on each tooth in the first set; and
    a second inverter for supplying alternating current to the second winding on each tooth in the second set.

14. The electric machine of claim 13, wherein the first inverter is suitable for coupling to a high voltage battery, and wherein the second inverter is suitable for coupling to a low voltage battery.

15. The electric machine of claim 14, further comprising a unidirectional DC/DC converter disposed between the first inverter and the low voltage battery.

16. A vehicle comprising the electric machine of claim 1.

17. The vehicle of claim 16, wherein the electric machine is coupled to a crankshaft of an internal combustion engine.

18. A stator for an electric machine, the stator comprising:
    a first set of teeth each having a first winding; and
    a second set of teeth each having a second winding;
    wherein the first and second windings are different from each other, and wherein the first and second windings are configured to be selectively energized independently of each other, and
    wherein the stator comprises a C-shaped segment, wherein the first set of teeth are arranged in a first group and a second group within the C-shaped segment, and wherein the first and second groups are diametrically opposite each other.

19. The stator of claim 18, wherein the first winding has a first winding count, and wherein the second winding has a second winding count that is different from the first winding count.

20. An electric machine comprising a rotor and a stator, wherein the stator comprises:
    a first set of teeth, each tooth in the first set having a first winding; and
    a second set of teeth, each tooth in the second set having a second winding;
    wherein the first and second windings are different from each other, and wherein the first and second windings are configured to be selectively energized independently of each other, and
    wherein the stator comprises first and second arcuate segments, the first and second arcuate segments each comprising nine (9) teeth having an angular spacing equivalent to that of a circular stator of equivalent diameter having twenty-seven (27) teeth.

* * * * *